(12) United States Patent
Ito

(10) Patent No.: US 12,454,012 B2
(45) Date of Patent: Oct. 28, 2025

(54) COATED TOOL

(71) Applicant: KYOCERA CORPORATION, Kyoto (JP)

(72) Inventor: Hirotoshi Ito, Satsumasendai (JP)

(73) Assignee: KYOCERA CORPORATION, Kyoto (JP)

(*) Notice: Subject to any disclaimer, the term of this patent is extended or adjusted under 35 U.S.C. 154(b) by 393 days.

(21) Appl. No.: 17/914,740

(22) PCT Filed: Mar. 24, 2021

(86) PCT No.: PCT/JP2021/012105
§ 371 (c)(1),
(2) Date: Sep. 26, 2022

(87) PCT Pub. No.: WO2021/193677
PCT Pub. Date: Sep. 30, 2021

(65) Prior Publication Data
US 2023/0158578 A1  May 25, 2023

(30) Foreign Application Priority Data
Mar. 27, 2020 (JP) ................. 2020-057635

(51) Int. Cl.
B23B 27/14 (2006.01)
C23C 16/36 (2006.01)
(Continued)

(52) U.S. Cl.
CPC ............ *B23B 27/148* (2013.01); *C23C 16/36* (2013.01); *C23C 16/403* (2013.01);
(Continued)

(58) Field of Classification Search
None
See application file for complete search history.

(56) References Cited

U.S. PATENT DOCUMENTS 6,756,111 B1   6/2004 Okada et al.
2003/0070305 A1   4/2003 Oshika et al.
(Continued)

FOREIGN PATENT DOCUMENTS

JP   2003145311 A   5/2003
JP   2017221992 A   12/2017
(Continued)

OTHER PUBLICATIONS

S.J. Bull, D.G. Bhat, M.H. Staia Properties and performance of commercial TiCN coatings. Part 1: coating architecture and hardness modeling Surf. Coat. Technol., 163-164 (2003), pp. 499-506 (Year: 2003).*

*Primary Examiner* — Elizabeth Collister
(74) *Attorney, Agent, or Firm* — HAUPTMAN HAM, LLP

(57) ABSTRACT

A coated tool includes a base and a coating film on the base. The coating film includes an $Al_2O_3$ layer, and a surface layer on the $Al_2O_3$ layer. The surface layer has a first erosion rate of 0.1 μm/min or less. The first erosion rate is obtained from measurement by causing a liquid A, in which 3 mass % of amorphous $Al_2O_3$ particles having a mean particle diameter of 1.1-1.3 μm is dispersed in purified water, to collide with the surface layer. The surface layer has a second erosion rate of 2.0 μm/min or more. The second erosion rate is obtained from measurement by causing a liquid B, in which 3 mass % of spherical $Al_2O_3$ particles having a mean particle diameter of 2.8-3.2 μm is dispersed in purified water, to collide with the surface layer.

2 Claims, 3 Drawing Sheets

(51) Int. Cl.
*C23C 16/40* (2006.01)
*C23C 28/04* (2006.01)
(52) U.S. Cl.
CPC .......... *C23C 28/042* (2013.01); *C23C 28/044* (2013.01); *B23B 2224/04* (2013.01); *B23B 2224/28* (2013.01); *B23B 2224/32* (2013.01); *B23B 2224/36* (2013.01); *B23B 2228/10* (2013.01)

(56) References Cited

U.S. PATENT DOCUMENTS

| | | | | |
|---|---|---|---|---|
| 2016/0136786 | A1* | 5/2016 | Bjormander | B24D 3/34 51/309 |
| 2016/0265106 | A1* | 9/2016 | Kumar | C23C 16/34 |
| 2017/0087641 | A1 | 3/2017 | Okude et al. | |
| 2017/0333997 | A1* | 11/2017 | Kusuda | B23B 29/02 |
| 2019/0232380 | A1 | 8/2019 | Kanaoka et al. | |

FOREIGN PATENT DOCUMENTS

| | | |
|---|---|---|
| WO | 0079022 A1 | 12/2000 |
| WO | 2017163972 A1 | 9/2017 |

* cited by examiner

COATED TOOL

CROSS-REFERENCE TO RELATED APPLICATION

The present application is a National Phase of International Application No. PCT/JP2021/012105, filed Mar. 24, 2021, which claims priority to Japanese Patent Application No. 2020-057635, filed Mar. 27, 2020. The contents of this Japanese application are incorporated herein by reference in their entirety.

TECHNICAL FIELD

The present disclosure relates to a coated tool.

BACKGROUND

A coated tool with a coating film disposed on a base of cemented carbide or the like is used in a cutting process. A coating film in which a TiN layer, a TiCN layer and an $Al_2O_3$ layer are sequentially laminated one upon another on the base has been known. A technology has been employed which makes it easy to distinguish a used corner by further disposing a TiN layer on the $Al_2O_3$ layer so that the TiN layer can be removed during use.

Japanese Unexamined Patent Publication No. 2017-221992 (Patent Document 1) discusses that a TiN layer and a Ti-based film other than TiN are disposed on an $Al_2O_3$ layer.

Nanjo Yoshiyasu and other four persons, "Research related to evaluations of mechanical properties of TiCN single layer film and TiCN multilayer film by Micro Slurry-Jet Erosion (MSE) method" Journal of the Japan Society of Precision Engineering, 2018, 84(2), pp. 167-174 (Non-Patent Document 1) is the research related to the evaluations of mechanical properties of a coating film, and evaluates the TiN layer and the TiCN layer by the MSE method. Non-Patent Document 1 discusses a test where a slurry obtained by mixing amorphous (polygonal) alumina having a particle size of 8000 with purified water is projected to the coating film. Non-Patent Document 1 describes that a smaller erosion rate obtained by the MSE method leads to more superior mechanical properties of the coating film.

WO 2017/163972 (Patent Document 2) discusses an evaluation of wear resistance of a hard coating by the MSE method using amorphous (polygonal) alumina particles having a particle size of 8000. Patent Document 2 describes that a smaller erosion rate obtained by the MSE method leads to more superior mechanical properties of the hard coating.

SUMMARY

A coated tool in a non-limiting embodiment of the present disclosure includes a base and a coating film located on the base. The coating film includes an $Al_2O_3$ layer, and a surface layer located in a region from a first surface on a side away from the base in the $Al_2O_3$ layer to a second surface that is a surface of the coating film. The surface layer has a first erosion rate of 0.1 μm/min or less. The first erosion rate is obtained from measurement by causing a liquid A, in which 3 mass % of amorphous $Al_2O_3$ particles having a mean particle diameter of 1.1-1.3 μm is dispersed in purified water, to collide with the surface layer. The surface layer has a second erosion rate of 2.0 μm/min or more. The second erosion rate is obtained from measurement by causing a liquid B, in which 3 mass % of spherical $Al_2O_3$ particles having a mean particle diameter of 2.8-3.2 μm is dispersed in purified water, to collide with the surface layer.

EMBODIMENT

<Coated Tools>

Figure 1:
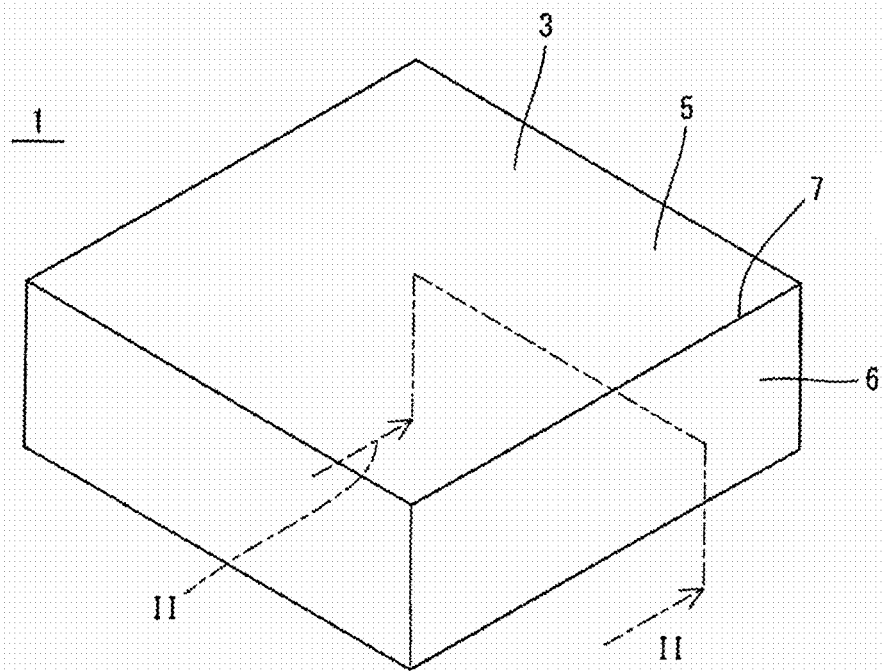
FIG. 1 is a perspective view illustrating a coated tool in a non-limiting embodiment of the present disclosure.

Coated tools 1 in non-limiting embodiments of the present disclosure are described in detail below with reference to the drawings. For the convenience of description, the drawings referred to in the following illustrate, in simplified form, only configurations necessary for describing the embodiments. The coated tools 1 may therefore include any arbitrary structural member not illustrated in the drawings referred to. Dimensions of the configurations in each of the drawings faithfully represent neither dimensions of actual structural members nor dimensional ratios of these members.

Figure 2:
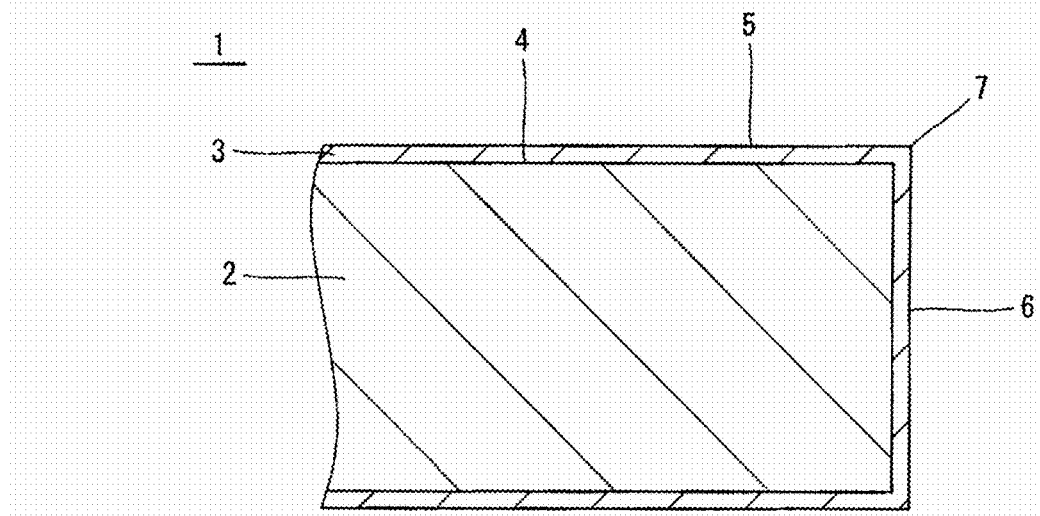
FIG. 2 is a sectional view of a cross section taken along the line II-II in the coated tool illustrated in FIG. 1.
Figure 3:
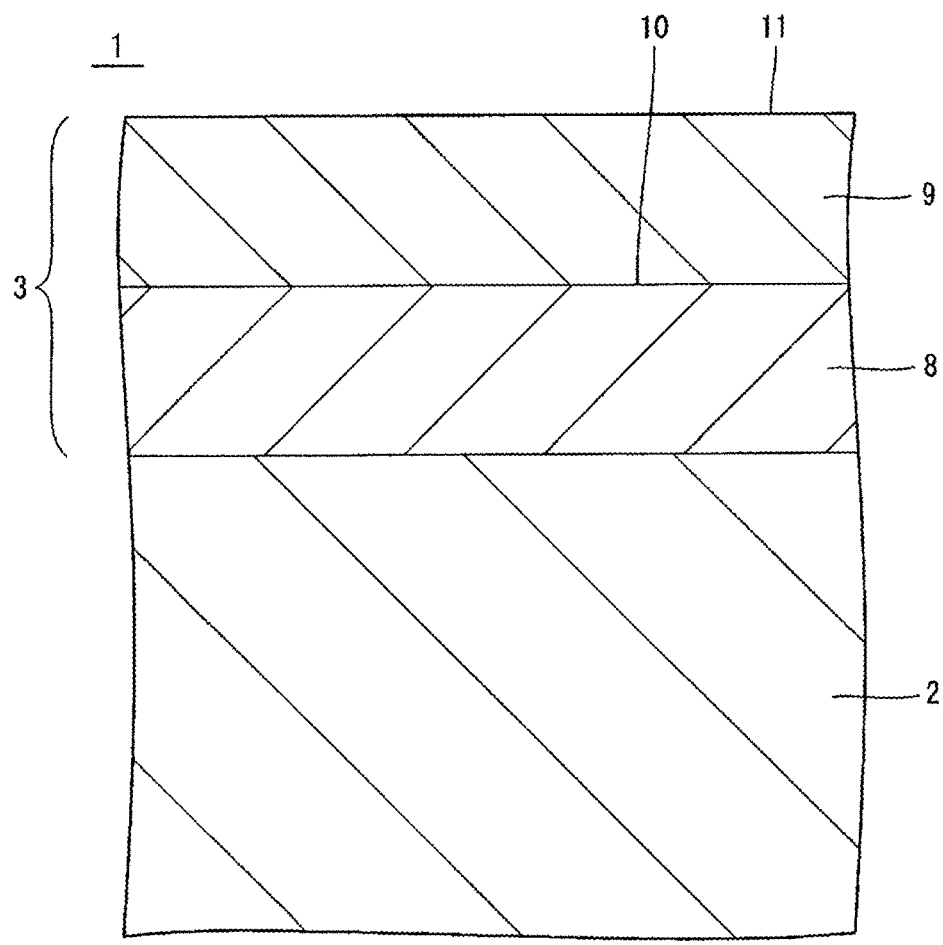
FIG. 3 is an enlarged view around a coating film in the coated tool illustrated in FIG. 2.

FIGS. 1 to 3 illustrate, as an embodiment of the coated tools 1, a cutting insert applicable to a cutting tool used for a cutting process of a workpiece. The coated tool 1 is applicable to, besides cutting tools, wear resistant parts such as sliding parts and metal molds, digging tools, tools such as blades, and impact resistant parts. Applications of the coated tools 1 are not limited to those exemplified above.

The coated tool 1 may include a base 2 and a coating film 3 located on the base 2.

Examples of material of the base 2 may include hard alloys, ceramics and metals. Examples of the hard alloys may include cemented carbides in which a hard phase composed of WC (tungsten carbide) and, if desired, at least one kind selected from the group consisting of carbide, nitride and carbonitride of group 4, group 5 and group 6 metals in the periodic table other than WC is bonded by a binding phase composed of an iron group metal such as Co (cobalt) or Ni (nickel). Other hard alloys may be Ti-based cermets. The ceramics may be, for example, $Si_3N_4$ (silicon nitride), $Al_2O_3$ (aluminum oxide), diamond and cBN (cubic boron nitride). The metals may be, for example, carbon steel, high-speed steel and alloy steel. The material of the base 2 is however not limited to those exemplified above.

The coating film 3 may cover a whole or a part of the surface 4 of the base 2. If the coating film 3 covers only the part of the surface 4 of the base 2, it may be said that the coating film 3 is located on at least the part of the base 2.

The coating film 3 may be deposed by chemical vapor deposition (CVD) method. In other words, the coating film 3 may be a CVD film.

The coating film 3 is not limited to a specific thickness. A thickness of the coating film 3 may be set to, for example, 1-30 μm. The thickness and structure of the coating film 3, and shapes of crystals constituting the coating film 3 may be measured by, for example, cross-section observation with an electron microscope. Examples of the electron microscope may include Scanning Electron Microscope (SEM) and Transmission Electron Microscope (TEM).

The coated tool 1 may include a first surface 5 (upper surface), a second surface 6 (lateral surface) adjacent to the first surface 5, and a cutting edge 7 located on at least apart of a ridge part between the first surface 5 and the second surface 6 as in in a non-limiting embodiment illustrated in FIGS. 1 and 2.

The first surface 5 may be a rake surface. A whole or a part of the first surface 5 may be the rake surface. For example, a region extending along the cutting edge 7 in the first surface 5 may be the rake surface.

The second surface 6 may be a flank surface. A whole or a part of the second surface 6 may be the flank surface. For example, a region extending along the cutting edge 7 in the second surface 6 may be the flank surface.

The cutting edge 7 may be located on a part or a whole of the ridge part. The cutting edge 7 is usable for cutting out a workpiece.

The coated tool 1 may have a quadrangular plate shape as in the non-limiting embodiment illustrated in FIG. 1. The shape of the coated tool 1 is not limited to the quadrangular plate shape. For example, the first surface 5 may have a triangular shape, a pentagonal shape, a hexagonal shape, or a circular shape. The coated tool 1 may have a columnar shape.

The coated tool 1 is not limited to a specific size. For example, a length of one side of the first surface 5 may be set to approximately 3-20 mm. A height from the first surface 5 to a surface (lower surface) located on a side opposite to the first surface 5 may be set to approximately 5-20 mm.

The coating film 3 may include an $Al_2O_3$ layer 8 and a surface layer 9 as in a non-limiting embodiment illustrated in FIG. 3.

The $Al_2O_3$ layer 8 may include $Al_2O_3$ particles. The $Al_2O_3$ layer 8 may denote a layer including $Al_2O_3$ as a main ingredient. The term "main ingredient" may denote an ingredient having the largest value of mass % compared with other ingredients.

The surface layer 9 may be located in a region from a first surface 10 on a side away from the base 2 in the $Al_2O_3$ layer 8 to a second surface 11 that is a surface of the coating film 3. The surface layer 9 may include the second surface 11. The surface layer 9 may be in contact with the $Al_2O_3$ layer 8.

An erosion rate of the surface layer 9 may be obtained by an MSE (Micro Slurry-jet Erosion) test. Amorphous $Al_2O_3$ particles and spherical $Al_2O_3$ particles may be used in the MSE test.

The amorphous $Al_2O_3$ particles may be ones which are manufactured by, for example, pulverizing raw material particles, or alternatively, by forming fractured surfaces and corners in a grinding process. The amorphous $Al_2O_3$ particles may be rephrased as angular $Al_2O_3$ particles.

The spherical $Al_2O_3$ particles may have a shape similar to a sphere without corners. The shape of the spherical $Al_2O_3$ particles need not be the sphere, but a small deformation is admissible if there is neither a fractured surface nor a corner.

MSE test results using the amorphous $Al_2O_3$ particles may be ones which are available by evaluation of wear resistance of the surface layer 9. Hereinafter, an erosion rate obtained by the MSE test using the amorphous $Al_2O_3$ particles is referred to as a first erosion rate. A low first erosion rate means excellent wear resistance.

MSE test results using the spherical $Al_2O_3$ particles may be ones which are available by evaluation of peeling resistance of the surface layer 9. Hereinafter, an erosion rate obtained by the MSE test using the spherical $Al_2O_3$ particles is referred to as a second erosion rate. A low second erosion rate means excellent peeling resistance. In other words, a high second erosion rate means being easy to peel off.

The first erosion rate may be 0.1 μm/min or less. The second erosion rate may be 2.0 μm/min or more. These ensure excellent wear resistance, and also ensure that the surface of the coating film 3 is easy to peel off. It is possible to avoid the coating film 3 from being entirely broken by a large impact because the surface thereof is easy to peel off. This consequently leads to excellent fracture resistance. Specifically, excellent wear resistance is attainable if the first erosion rate is 0.1 μm/min or less. The surface layer 9 is easy to peel off from the $Al_2O_3$ layer 8 if the second erosion rate is 2.0 μm/min or more. That is, the surface of the coating film 3 is easy to peel off. It is therefore easy to distinguish a used corner (the cutting edge 7) or the like. This also ensures excellent fracture resistance.

The first erosion rate may be obtained in the following manner. By causing a liquid A, in which 3 mass % of amorphous $Al_2O_3$ particles having a mean particle diameter of 1.1-1.3 μm is dispersed in 100 mass % of purified water, to collide with an inspection object (the surface layer 9), a depth of the inspection object removed by collision may be evaluated.

The second erosion rate may be obtained in the following manner. By causing a liquid B, in which 3 mass % of spherical $Al_2O_3$ particles having a mean particle diameter of 2.8-3.2 μm is dispersed in 100 mass % of purified water, to collide with an inspection object, a depth of the inspection object removed by collision may be evaluated. A mean particle diameter of the spherical $Al_2O_3$ particles may be 2.9-3.1 μm.

In measuring the first erosion rate and the second erosion rate, the liquid A or B may be caused to collide at a velocity of 98-102 m/s so that the liquid A or B can collide with a surface of the object (surface layer 9) at approximately right angles.

The erosion rate may be measured with an MSE tester (MSE-Al2O3) manufactured by Palmeso Co., Ltd. For example, "MSE-GA-1-3" manufactured by Palmeso Co., Ltd. may be used as amorphous $Al_2O_3$ particles. For example, "MSE-BA-3-3-10" manufactured by Palmeso Co., Ltd. may be used as spherical $Al_2O_3$ particles. Mean particle diameters of the amorphous $Al_2O_3$ particles and the spherical $Al_2O_3$ particles may be values obtained by image processing of SEM photographs.

The first erosion rate may be 0.05 μm/min or less. Alternatively, the first erosion rate may be 0.01 μm/min or less. The second erosion rate may be 5.0 μm/min or more. Alternatively, the second erosion rate may be 3.0 μm/min or more.

The $Al_2O_3$ layer 8 may or may not be in contact with the base 2. For example, another layer may be located between the $Al_2O_3$ layer 8 and the base 2. In other words, the coating film 3 may include another layer located between the $Al_2O_3$ layer 8 and the base 2.

The surface layer 9 may include a TiN film. The surface layer 9 including the TiN film is easy to peel off.

The TiN film may be in contact with the $Al_2O_3$ layer 8. If the TiN film is in contact with the $Al_2O_3$ layer 8, the TiN film is easy to peel off from the $Al_2O_3$ layer 8. However, if the coating film 3 is composed only of the TiN film, it has poor wear resistance despite being easy to peel off.

The TiN film may include TiN particles. The TiN film may denote a film including TiN as a main ingredient. These are also true for other films.

The surface layer 9 may include a TiC film. The surface layer 9 (coating film 3) including the TiC film has excellent wear resistance.

The TiC film may not be in contact with the $Al_2O_3$ layer 8. If the TiC film is in contact with the $Al_2O_3$ layer 8, the surface layer 9 is less likely to peel off due to high adhesion between the $Al_2O_3$ layer 8 and TiC film. Therefore, at least another film may be located between the $Al_2O_3$ layer 8 and the TiC film. In other words, the surface layer 9 may include the TiC film, and at least another film located between the TiC film and the $Al_2O_3$ layer 8. For example, a TiN film may be located between the $Al_2O_3$ layer 8 and the TiC film.

The surface layer 9 may include a TiCN film. The TiCN film may basically have properties intermediate between the TiN film and the TiC film. Specifically, the TiCN film has adhesion and wear resistance which are intermediate to those of the TiN and TiC.

For example, peeling off is basically less likely to occur if the $Al_2O_3$ layer 8 is in contact with the TiCN film than if the $Al_2O_3$ layer 8 is not in contact with the TiCN film. In order to satisfy the configuration of the coated tool 1 in cases where the $Al_2O_3$ layer 8 is in contact with the TiCN film, the TiCN film needs to be easy to peel off.

For example, the TiCN film having a high N (nitrogen) content is easy to peel off. In order to obtain an easy-peeling TiCN film, N/(C+N) of the TiCN film may be 0.7 or more. The TiCN film whose N/(C+N) is 0.7 or more may be manufactured, for example, by increasing a nitrogen content in a film forming gas at a temperature lower than 1000° C. Alternatively, the N/(C+N) of the TiCN film may be 0.9 or less. The N/(C+N) is calculated in atomic ratio.

For example, if the $Al_2O_3$ layer 8 is not in contact with the TiCN film, the N/(C+N) may be less than 0.7. Alternatively, the N/(C+N) may be 0.5 or more.

The N/(C+N) may be a content ratio in atomic ratio of N relative to a sum of C and N. The N/(C+N) may be measured by an energy dispersive X-ray spectroscopy (EDS) analysis method.

The surface layer 9 may include a TiN layer, a TiC layer and a TiCN layer in this order from a side of the $Al_2O_3$ layer 8. The surface layer 9 having this configuration is excellent in wear resistance, and the surface of the coating film 3 is easy to peel off.

<Method for Manufacturing Coated Tool>

A method for manufacturing a coated tool in a non-limiting embodiment of the present disclosure is described below by illustrating an embodiment of manufacturing the coated tool 1 having the above evaluation results in the MSE test.

The base 2 may be firstly manufactured. A description is made by illustrating cases where a base 2 composed of a hard alloy is manufactured as the base 2. Firstly, a mixed powder may be prepared by suitably adding metal powder, carbon powder or the like to an inorganic powder of metal carbide, nitride, carbonitride, oxide or the like, which are capable of forming the base 2 by sintering, followed by mixing them together. With a known molding method, such as press molding, casting molding, extrusion molding or cold isostatic pressing, a molded body may be obtained by molding the mixed powder into a predetermined tool shape. Subsequently, the base 2 may be obtained by sintering the obtained molded body in a vacuum or a non-oxidizing atmosphere. A surface 4 of the base 2 may be subjected to polishing process and honing process.

Subsequently, the coated tool 1 may be obtained by depositing a coating film 3 on the surface 4 of the obtained base 2 by CVD method.

The $Al_2O_3$ layer 8 may be deposited as follows. Firstly, a mixed gas may be prepared as a reaction gas composition. The mixed gas is composed of 0.5-5 vol % of aluminum trichloride ($AlCl_3$) gas, 0.5-3.5 vol % of hydrogen chloride (HCl) gas, 0.5-5 vol % of carbon dioxide ($CO_2$) gas, 0.5 vol % or less of hydrogen sulfide ($H_2S$) gas, and the rest, namely, hydrogen ($H_2$) gas. The $Al_2O_3$ layer 8 may be deposited by loading the mixed gas into a chamber in which a set temperature is 930-1010° C., a set pressure is 5-10 kPa and a set time is 30-300 minutes.

A TiN film of the surface layer 9 may be deposited as follows. Firstly, a mixed gas may be prepared as a reaction gas composition. The mixed gas is composed of 0.1-10 vol % of titanium tetrachloride ($TiCl_4$) gas, 10-60 vol % of nitrogen ($N_2$) gas, and the rest, namely, hydrogen ($H_2$) gas. The TiN film may be deposited by loading the mixed gas into the chamber in which a set temperature is 800-1010° C., a set pressure is 10-85 kPa and a set time is 5-90 minutes.

A TiC film of the surface layer 9 may be deposited as follows. Firstly, a mixed gas may be prepared as a reaction gas composition. The mixed gas is composed of 0.1-30 vol % of titanium tetrachloride ($TiCl_4$) gas, 0.1-20 vol % of methane ($CH_4$) gas, and the rest, namely, hydrogen ($H_2$) gas. The TiC film may be deposited by loading the mixed gas into the chamber in which a set temperature is 800-1100° C., a set pressure is 5-85 kPa and a set time is 5-90 minutes.

A TiCN film of the surface layer 9 may be deposited as follows. Firstly, a mixed gas may be prepared as a reaction gas composition. The mixed gas is composed of 0.1-10 vol % of titanium tetrachloride ($TiCl_4$) gas, 10-60 vol % of nitrogen ($N_2$) gas, 0.1-20 vol % of methane ($CH_4$) gas, and the rest, namely, hydrogen ($H_2$) gas. The TiCN film may be deposited by loading the mixed gas into the chamber in which a set temperature is 800-1050° C., a set pressure is 5-30 kPa and a set time is 5-90 minutes.

The coated tool 1 having the first erosion rate and the second erosion rate described above is obtainable, for example, by controlling a combination of the TiN film, the TiCN film and TiC film, the order of lamination, or an N content in the TiCN film.

A region including the cutting edge 7 in the coated tool 1 thus obtained may be subjected to a polishing process. Consequently, the region including the cutting edge 7 can be made smooth, so that welding of a workpiece can be reduced to improve fracture resistance of the cutting edge 7.

The above manufacturing method is an embodiment of methods for manufacturing the coated tool 1. Accordingly, it should be noted that the coated tool 1 is not limited to ones which are manufactured by the above manufacturing method.

<Cutting Tool>

Figure 4:
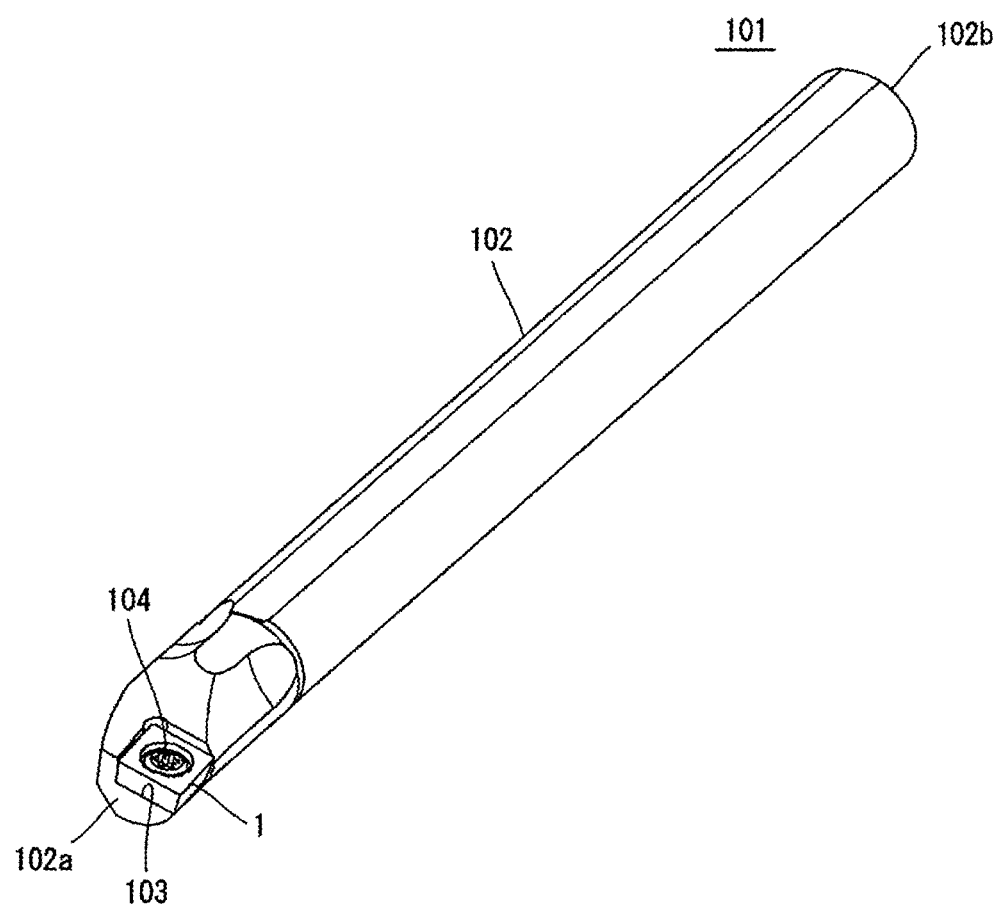
FIG. 4 is a perspective view illustrating a cutting tool in a non-limiting embodiment of the present disclosure.

As in a non-limiting embodiment illustrated in FIG. 4, a cutting tool 101 in the non-limiting embodiment of the present disclosure may include a holder 102 having a length from a first end 102a to a second end 102b and including a pocket 103 located on a side of the first end 102a, and a coated tool 1 located in the pocket 103. FIG. 4 illustrates the embodiment where the coated tool 1 includes a through hole and the coated tool 1 is secured through the through hole to the pocket 103 with a screw 104.

The present disclosure is described in detail below by illustrating examples, however, the present disclosure is not limited to the following examples.

EXAMPLES

[Samples Nos. 1 to 13]

<Coated Tool Manufacturing>

Firstly, a base was manufactured. Specifically, 6 mass % of metal Co powder having a mean particle diameter of 1.5

μm, 2.0 mass % of TiC (titanium carbide) powder, 0.2 mass % of $Cr_3C_2$ (chromium carbide) powder were added in their respective proportions to WC powder having a mean particle diameter of 1.2 μm, and these were mixed together. A molded body was obtained by molding a mixture thus obtained into a cutting tool shape (CNMG120408) by press molding. The obtained molded body was then subjected to debinding process and then sintering at 1400° C. in a vacuum of 0.5-100 Pa for one hour, thereby manufacturing a base composed of cemented carbide. Thereafter, a side of a rake surface (first surface) of the manufactured base was subjected to cutting edge processing (round honing) by brushing process.

Subsequently, a coating film (surface layer) was deposited on the obtained base by CVD method under deposition conditions presented in Table 1, thereby obtaining a coated tool (cutting insert) presented in Table 2.

All the coated tools presented in Table 2 include the $Al_2O_3$ layer deposited on the base. Deposition conditions and thickness of the $Al_2O_3$ layer are as follows.

$AlCl_3$ gas: 4.0 vol %
HCl gas: 2.0 vol %
$CO_2$ gas: 4.0 vol %
$H_2S$ gas: 0.3 vol %
$H_2$ gas: the rest
Temperature: 1000° C.
Pressure: 5 kPa
Time: 240 minutes
Thickness: 4.0 μm Individual compounds are respectively indicated by chemical symbols in Tables 1 and 2. Thicknesses of the coating films presented in Table 1 and thicknesses of the $Al_2O_3$ layers are values obtained by a cross-section observation using an SEM. Values N/(C+N) in these tables are expressed in atomic ratio.

<Evaluation>

An erosion rate of each of the obtained coated tools was measured. A measuring method is described below, and results are shown in Table 2.

(Erosion Rate)

First and second erosion rates (μm/min) were individually measured by causing a liquid A or B to collide with a surface of the coating film from a direction of right angles at a velocity of 100 m/s. The erosion rates were measured with an MSE tester "MSE-A-Al2O3" manufactured by Palmeso Co., Ltd. "MSE-GA-1-3" having a mean particle diameter of 1.2 μm manufactured by Palmeso Co., Ltd was used as amorphous $Al_2O_3$ particles. "MSE-B-A-3-3" having a mean particle diameter of 3.0 μm manufactured by Palmeso Co., Ltd. was used as spherical $Al_2O_3$ particles.

(Cutting Performance)

Cutting performance evaluations of the obtained coated tools were carried out to evaluate wear resistance and fracture resistance of the manufactured coated tools. Evaluation conditions are as follows. Evaluations results are presented in Table 2.

Wear Resistance Evaluation
  Machining method: Turning process
  Workpiece: S45C round rod
  Cutting speed: 200 m/min
  Depth of Cut: 1.5 mm
  Feed rate: 0.3 mm/rev
  Machining state: Wet
  Determining method: Evaluation made by cutting time elapsed until a width of flank wear reached 0.3 mm Fracture Resistance Evaluation
  Machining method: Turning process
  Workpiece: S45C round rod with 16 grooves
  Cutting speed: 100 m/min
  Depth of Cut: 1.0 mm
  Feed rate: 0.3 mm/rev
  Machining state: Wet
  Determining method: Evaluation made by cutting time elapsed until a cutting edge fracture occurred

TABLE 1

| Sample No. | Surface layer | $TiCl_4$ (vol %) | $N_2$ (vol %) | $CH_4$ (vol %) | $H_2$ (vol %) | Temperature (° C.) | Pressure (kPa) | Time (minutes) | Layer configuration | Layer Thickness (μm) | N/(C + N) |
|---|---|---|---|---|---|---|---|---|---|---|---|
| 1 | First layer | 1.0 | 14.0 | — | Rest | 1000 | 30 | 80 | TiN | 1.5 | 1 |
| 2 | First layer | 2.0 | — | 5.0 | Rest | 1000 | 15 | 90 | TiC | 1.5 | 0 |
| 3 | First layer | 1.5 | 10.5 | 1.5 | Rest | 1000 | 30 | 80 | TiCN | 1.5 | 0.6 |
| 4 | First layer | 2.0 | 30.0 | — | Rest | 950 | 20 | 15 | TiN | 0.3 | 1 |
|   | Second layer | 2.0 | — | 5.0 | Rest | 1000 | 75 | 45 | TiC | 0.7 | 0 |
|   | Third layer | 2.0 | 20.0 | 3.5 | Rest | 1000 | 20 | 30 | TiCN | 0.5 | 0.8 |
| 5 | First layer | 1.5 | 10.5 | 1.5 | Rest | 1000 | 30 | 15 | TiCN | 0.3 | 0.6 |
|   | Second layer | 2.0 | — | 5.0 | Rest | 1000 | 75 | 45 | TiC | 0.7 | 0 |
|   | Third layer | 2.0 | 20.0 | 3.5 | Rest | 1000 | 20 | 30 | TiCN | 0.5 | 0.8 |
| 6 | First layer | 2.0 | 20.0 | 3.5 | Rest | 950 | 20 | 10 | TiCN | 0.1 | 0.8 |
|   | Second layer | 2.0 | 30.0 | — | Rest | 950 | 20 | 15 | TiN | 0.2 | 1 |
|   | Third layer | 2.0 | — | 5.0 | Rest | 1000 | 50 | 45 | TiC | 0.7 | 0 |
|   | Fourth layer | 1.5 | 10.5 | 1.5 | Rest | 1000 | 30 | 30 | TiCN | 0.5 | 0.6 |
| 7 | First layer | 2.0 | — | 5.0 | Rest | 950 | 30 | 60 | TiC | 1 | 0 |
|   | Second layer | 1.5 | 10.5 | 1.5 | Rest | 950 | 30 | 30 | TiCN | 0.5 | 0.6 |
| 8 | First layer | 2.0 | 30.0 | — | Rest | 950 | 15 | 15 | TiN | 0.3 | 1 |
|   | Second layer | 2.0 | — | 5.0 | Rest | 1000 | 15 | 45 | TiC | 0.7 | 0 |
|   | Third layer | 1.0 | 14.0 | — | Rest | 1000 | 15 | 30 | TiN | 0.5 | 1 |
| 9 | First layer | 2.0 | 30.0 | — | Rest | 950 | 15 | 15 | TiN | 0.3 | 1 |
|   | Second layer | 1.5 | 10.5 | 1.5 | Rest | 1000 | 30 | 15 | TiCN | 0.3 | 0.6 |
|   | Third layer | 2.0 | — | 5.0 | Rest | 1000 | 50 | 60 | TiC | 0.9 | 0 |
| 10 | First layer | 2.0 | 20.0 | 3.5 | Rest | 950 | 30 | 30 | TiCN | 0.5 | 0.6 |
|    | Second layer | 1.0 | 14.0 | — | Rest | 1000 | 15 | 60 | TiN | 1 | 1 |
| 11 | First layer | 1.5 | 10.5 | 1.5 | Rest | 1000 | 30 | 30 | TiCN | 0.5 | 0.8 |
|    | Second layer | 1.0 | 14.0 | — | Rest | 1000 | 15 | 60 | TiN | 1 | 1 |

TABLE 1-continued

| Sample No. | Surface layer | TiCl$_4$ (vol %) | N$_2$ (vol %) | CH$_4$ (vol %) | H$_2$ (vol %) | Temperature (° C.) | Pressure (kPa) | Time (minutes) | Layer configuration | Layer Thickness (μm) | N/(C + N) |
|---|---|---|---|---|---|---|---|---|---|---|---|
| 12 | First layer | 2.0 | 30.0 | — | Rest | 950 | 15 | 15 | TiN | 0.3 | 1 |
|  | Second layer | 2.0 | — | 5.0 | Rest | 1000 | 50 | 75 | TiC | 1.2 | 0 |
| 13 | First layer | 1.0 | 14.0 | — | Rest | 1000 | 30 | 15 | TiN | 0.3 | 1 |
|  | Second layer | 2.0 | — | 5.0 | Rest | 1000 | 50 | 75 | TiC | 1.2 | 0 |

TABLE 2

| Sample No. | First erosion rate (μm/min) | Second erosion rate (μm/min) | Evaluation of flank wear (min) | Evaluation of fracture resistance (min) |
|---|---|---|---|---|
| 1 | 0.4 | 2.7 | 15 | 28 |
| 2 | 0.03 | 1.2 | 35 | 10 |
| 3 | 0.15 | 1.5 | 20 | 17 |
| 4 | 0.04 | 3 | 40 | 35 |
| 5 | 0.04 | 1.4 | 33 | 12 |
| 6 | 0.01 | 3 | 48 | 40 |
| 7 | 0.01 | 1.2 | 35 | 10 |
| 8 | 0.04 | 5 | 38 | 35 |
| 9 | 0.08 | 5 | 42 | 35 |
| 10 | 0.2 | 2 | 20 | 31 |
| 11 | 0.2 | 1.6 | 20 | 22 |
| 12 | 0.1 | 2.1 | 36 | 32 |
| 13 | 0.1 | 1.9 | 30 | 25 |

As shown in Table 2, Samples Nos. 1, 2, 3, 5, 7, 10, 11 and 13, which were comparative examples, were poor in wear resistance of the flank surface or fracture resistance. The individual coated tools of the present disclosure had excellent wear resistance and fracture resistance.

DESCRIPTION OF THE REFERENCE NUMERAL

1 coated tool (cutting insert)
2 base
3 coating film
4 surface
5 first surface
6 second surface
7 cutting edge
8 Al$_2$O$_3$ layer
9 surface layer
10 first surface
11 second surface
101 cutting tool
102 holder
102a first end
102b second end
103 pocket
104 screw

The invention claimed is:

1. A coated tool, comprising:
a base; and
a coating film located on the base, the coating film comprising:
an Al$_2$O$_3$ layer, and
a surface layer located in a region from a first surface on a side away from the base in the Al$_2$O$_3$ layer to a second surface that is a surface of the coating film, wherein the surface layer has a first erosion rate of 0.1 μm/min or less that is obtained from measurement by causing a liquid A, in which 3 mass % of amorphous Al$_2$O$_3$ particles having a mean particle diameter of 1.1-1.3 μm is dispersed in purified water, to collide with the surface layer, the surface layer has a second erosion rate of 2.0 μm/min or more that is obtained from measurement by causing a liquid B, in which 3 mass % of spherical Al$_2$O$_3$ particles having a mean particle diameter of 2.8-3.2 μm is dispersed in purified water, to collide with the surface layer, and the surface layer comprises a TiCN layer, a TiN layer, a TiC layer, and a TiCN layer in this order from a side of the Al$_2$O$_3$ layer.

2. A cutting tool, comprising:
a holder which has a length from a first end to a second end and comprises a pocket located on a side of the first end; and
a coated tool being located in the pocket, wherein
the coated tool comprises:
a base, and
a coating film located on the base, the coating film comprising:
an Al$_2$O$_3$ layer, and
a surface layer located in a region from a first surface on a side away from the base in the Al$_2$O$_3$ layer to a second surface that is a surface of the coating film, the surface layer has a first erosion rate of 0.1 μm/min or less that is obtained from measurement by causing a liquid A, in which 3 mass % of amorphous Al$_2$O$_3$ particles having a mean particle diameter of 1.1-1.3 μm is dispersed in purified water, to collide with the surface layer, the surface layer has a second erosion rate of 2.0 μm/min or more that is obtained from measurement by causing a liquid B, in which 3 mass % of spherical Al$_2$O$_3$ particles having a mean particle diameter of 2.8-3.2 μm is dispersed in purified water, to collide with the surface layer, and the surface layer comprises a TiCN layer, a TiN layer, a TiC layer and a TiCN layer in this order from a side of the Al$_2$O$_3$ layer.

* * * * *